United States Patent
Mouri

(10) Patent No.: US 12,420,247 B2
(45) Date of Patent: Sep. 23, 2025

(54) WASTE TREATMENT APPARATUS WITH ADJUSTABLE ANGLE STIRRING BLADES

(71) Applicants: Yoko Mouri, Tokyo (JP); Yuko Sazanami, Kumamoto (JP)

(72) Inventor: Yoko Mouri, Tokyo (JP)

(73) Assignees: Yoko Mouri, Tokyo (JP); Yuko Sazanami, Kumamoto (JP)

( * ) Notice: Subject to any disclaimer, the term of this patent is extended or adjusted under 35 U.S.C. 154(b) by 728 days.

(21) Appl. No.: 17/786,513

(22) PCT Filed: Dec. 27, 2019

(86) PCT No.: PCT/JP2019/051457
§ 371 (c)(1),
(2) Date: Jun. 16, 2022

(87) PCT Pub. No.: WO2021/131026
PCT Pub. Date: Jul. 1, 2021

(65) Prior Publication Data
US 2023/0027849 A1    Jan. 26, 2023

(51) Int. Cl.
*B01F 27/60* (2022.01)
*B01F 27/07* (2022.01)
(Continued)

(52) U.S. Cl.
CPC ............ *B01F 27/60* (2022.01); *B01F 27/071* (2022.01); *B01F 27/0726* (2022.01); *B01F 27/11251* (2022.01); *B09B 3/38* (2022.01)

(58) Field of Classification Search
CPC .... B01F 29/40111; B01F 29/30; B01F 29/81; B01F 31/22; B01F 2101/44;
(Continued)

(56) References Cited

U.S. PATENT DOCUMENTS

| 1,355,137 | A | * | 10/1920 | Frick | ....................... | B01F 27/70 |
| | | | | | | 366/326.1 |
| 4,281,934 | A | * | 8/1981 | Krause | .................... | E01C 19/46 |
| | | | | | | 366/326.1 |

(Continued)

FOREIGN PATENT DOCUMENTS

GB  2209477 A * 5/1989
JP  2001-327888 A  11/2001
(Continued)

OTHER PUBLICATIONS

Notice of Reasons for Refusal dated Sep. 6, 2022 for corresponding Japanese patent application No. 2021-566730, with English translation.
(Continued)

*Primary Examiner* — Charles Cooley
(74) *Attorney, Agent, or Firm* — LUCAS & MERCANTI, LLP

(57) ABSTRACT

A waste treatment apparatus includes: a body having a spherical shape and configured to accommodate a waste therein; and a stirring unit configured to stir the waste accommodated in the body. The stirring unit includes: a main shaft horizontally and rotatably disposed at a center portion in the inside of the body; a plurality of main shaft stirring blades having a flat plate shape, the plurality of main shaft stirring blades mounted on a surface of the main shaft; a plurality of support rods assembled to the main shaft at a predetermined interval, the plurality of support rods extending perpendicularly toward an inner peripheral surface of the body; and a plurality of stirring blades each having a rectangular flat plate shape, the plurality of stirring blades being mounted on distal ends of the plurality of support rods on an inner peripheral surface side of the body.

5 Claims, 7 Drawing Sheets

(51) Int. Cl.
*B01F 27/072* (2022.01)
*B01F 27/1125* (2022.01)
*B09B 3/38* (2022.01)

(58) Field of Classification Search
CPC ............ B01F 29/4011; B01F 29/40221; B01F 35/531; B01F 29/40222; B01F 35/5311; B01F 35/5312; B01F 35/532; B01F 35/55; B01F 27/86; B01F 35/53; B01F 27/60; B01F 27/07261; B01F 27/091; B01F 27/11251; B01F 27/1921; B01F 27/70; B01F 27/726; B01F 35/4122; B01F 35/54; B01F 27/071; B01F 27/0726; B01F 27/0727; B01F 29/40116; C12M 27/06; C12M 27/10; C12M 27/16; C12M 27/12; C12M 27/20; A47J 43/0727; A47J 43/046; A47J 43/085; A47J 45/062; A47J 45/072; B09B 3/00
USPC .......... 366/213, 214, 200, 306, 307, 325.92, 366/326.1; 435/304.2; 220/669, 675
See application file for complete search history.

(56) References Cited

U.S. PATENT DOCUMENTS

| | | | | |
|---|---|---|---|---|
| 4,660,987 | A | * | 4/1987 | Robinson .............. B01F 27/052 366/67 |
| 2023/0027849 | A1 | * | 1/2023 | Mouri .................. B01F 27/091 |

FOREIGN PATENT DOCUMENTS

| | | |
|---|---|---|
| JP | 2004-089937 A | 3/2004 |
| JP | 2017-006900 A | 1/2017 |
| JP | 2018-171576 A | 11/2018 |

OTHER PUBLICATIONS

Office Action for the corresponding Taiwanese Patent Application No. 109129859, mailed Oct. 18, 2023, with English translation, 10 pages.
International Search Report for the corresponding patent application No. PCT/JP2019/051457 dated Mar. 17, 2020, with English translation.

* cited by examiner

WASTE TREATMENT APPARATUS WITH ADJUSTABLE ANGLE STIRRING BLADES

CROSS REFERENCE TO RELATED APPLICATION

This Application is a 371 of PCT/JP2019/051457 filed on Dec. 27, 2019, which is incorporated herein by reference.

TECHNICAL FIELD

The present invention relates to a waste treatment apparatus, and more particularly to a waste treatment apparatus capable of efficiently reducing a volume of various industrial wastes such that the treated waste can be favorably used for recycling or can be easily discarded.

BACKGROUND ART

As representative industrial wastes, organic industrial wastes are named. Such industrial wastes include: wastes that are produced at manufacturing factories of foods such as vegetable waste, distiller dregs, fermented dregs, bony parts of fishes and animals or the like, and wastes that are produced in livestock industry such as feces and urines of livestock. Industrial wastes of household appliances (small-sized appliances) that include parts made of plastic or metal and are used in a recycled manner are also named. Such industrial wastes (hereinafter also simply referred to as wastes) have been conventionally subjected to volume reducing processing such as an incineration method or carbonization using a carbonizing device, and the wastes whose volumes are reduced are discarded.

However, with respect to the organic wastes, components of some organic wastes contain nutrition and energy derived from animals and plant. Accordingly, these organic wastes have a potential of being used as resources for fertilizers and the like. Further, among the wastes of household appliances, there are some household appliances that contain part made of plastic, metal or the like that can be recycled so that the parts can be reused as a resource. Further, due to the enactment of "Basic Law for promoting the establishment of recycling type society (2001)", the development of technologies relating to the treatment of the wastes have been vigorously proposed so as to cope with the appropriate treatment of wastes, the enhancement of recycling of the waste as resources, and the formation of the recycling type society.

In view of the above circumstances, as an apparatus capable of treating organic wastes particularly, there has been proposed an organic waste treatment apparatus having the following configuration and advantageous effects. A waste is charged into a body having a spherical shape. The waste is stirred by rotating a plurality of stirring blades that are disposed radially from the center of a rotary shaft that is rotatably disposed at a center portion in the inside of the body. With such stirring of the waste, the waste is crushed so that the volume of the waste is reduced. At the same time, by supplying hot air into the body, the waste accommodated in the body is subjected to heat and pressure so that the waste is dried. As a result, the reduction of the volume of the waste by crushing is further accelerated (see patent document 1).

PRIOR ART DOCUMENT

Patent Document

Patent Document 1
Japanese Patent Laid-Open No. 2018-171576

SUMMARY OF INVENTION

Problem to be Solved by the Invention

The apparatus described in patent document 1 crushes a waste while drying the waste so that the apparatus has excellent safety and durability and can reduce the volume of the waste with high efficiency. However, an amount of moisture that a waste contains differs corresponding to kinds of wastes. Accordingly, for example, a waste that contains a small amount of moisture thus having high adhesiveness gets tangled with the main shaft (the rotary shaft) rotatably disposed at a center portion in the inside of the body. As a result, there is a case where the stirring of a waste by the plurality of stirring blades disposed in the vicinity of an inner peripheral surface of the body having a spherical shape cannot be speedily performed.

Further, it is found that, corresponding to a kind of a waste, inclination of a predetermined angle with respect to a waste that the plurality of stirring blades disposed in the vicinity of an inner peripheral surface of the body having a spherical shape differs. For example, in case of a waste that contains a small amount of moisture thus having a high adhesiveness, the larger the inclination of the predetermined angle with respect to the rotary direction of the stirring blades, the more efficiently the waste can be stirred. On the other hand, in case of a waste that contains a large amount of moisture thus having a low adhesiveness, the smaller the inclination of the predetermined angle with respect to the rotary direction of the stirring blades, the more efficiently the waste can be stirred. Accordingly, when the inclination of the predetermined angle that is set using a support rod on which the stirring blade is mounted as a center axis is constant as in the case of the apparatus described in patent document 1, depending on a kind of a waste (mainly, viscosity determined based on an amount of moisture contained in the waste), there is a case where the efficiency of stirring the waste by the plurality of stirring blades is worsened.

The present invention has been made to overcome the above-mentioned drawback, and it is an object of the present invention to provide a waste treatment apparatus where a plurality of main shaft stirring blades are mounted on a surface of a main shaft that is rotated so that the waste treatment apparatus can stir a waste while efficiently peeling off the waste that gets tangled with the main shaft, and can change inclination of a predetermined angle of each of a plurality of stirring blades with respect to a center axis of each support rod that supports each stirring blade corresponding to a kind of the waste.

Solution to Problem

[1] To achieve the above-mentioned object, according to the present invention, there is provided a waste treatment apparatus that includes: a body having a spherical shape and configured to accommodate a waste therein; and a stirring unit configured to stir the waste accommodated in the body, The stirring unit includes: a main shaft horizontally and rotatably disposed at a center portion in an inside of the body; a plurality of main shaft stirring blades having a flat plate shape, the plurality of main shaft stirring blades being mounted on a surface of the main shaft; a plurality of support rods assembled to the main shaft at a predetermined interval, the plurality of support rods extending toward an inner peripheral surface of the body; and a plurality of stirring blades each having a rectangular flat plate shape, the plurality of stirring blades being mounted on distal ends of the plurality of support rods on an inner peripheral surface side of the body. The stirring unit further includes a detachably mounting portion that is configured to detachably mount the stirring blade on the support rod at a desired angle with respect to a center axis of the support rod.

The main shaft stirring blade is formed in a triangular shape where one end of the main shaft stirring blade in a longitudinal direction of the main shaft is set relatively higher than the other end of the main shaft stirring blade in the longitudinal direction of the main shaft as viewed in a side view, and the main shaft stirring blade is formed on a surface of the main shaft in a state where the main shaft stirring blade is bent in the longitudinal direction as well as in the circumferential direction.

The detachably mounting portion is formed of: a fitting protruding portion having a regular polygonal shape that is formed on a proximal end portion of the support rod; and a fitting recessed portion having the same regular polygonal shape as the fitting protruding portion that is formed on a distal end portion to which the stirring blade is connected, and the fitting protruding portion and the fitting recessed portion detachably engage with each other by fitting such that the fitting protruding portion is surrounded by the fitting recessed portion, and the faces of the regular polygonal shape where the fitting protruding portion and the fitting recessed portion are brought into contact with each other are selected so that an angle of inclination of the stirring blade with respect to a center axis of the support rod can be selected as desired.

The waste treatment apparatus further includes a hot air supply unit capable of supplying hot air to the inside of the body, wherein the stirring blade is formed of a porous plate in which a plurality of through holes are formed.

Advantageous Effects of Invention

According to the present invention, the stirring unit includes: the main shaft that is horizontally and rotatably disposed at the center portion in the inside of the body; the plurality of main shaft stirring blades having a flat plate shape, the plurality of main shaft stirring blades being mounted on the surface of the main shaft; the plurality of support rods assembled to the main shaft at a predetermined interval, the plurality of support rods extending perpendicularly toward the inner peripheral surface of the body; and the plurality of stirring blades each having a rectangular flat plate shape, the plurality of stirring blades being mounted on distal ends of the plurality of support rods on an inner peripheral surface side of the body. With such a configuration, by the main support stirring blades mounted on the main shaft, a waste that gets tangled with the main shaft rotatably disposed at the center portion in the inside of the body can be efficiently pealed off from the main shaft, and stirring of the waste by the plurality of stirring blades disposed in the vicinity of the inner peripheral surface of the body having a spherical shape can be enhanced.

Further, the stirring unit has the detachably mounting portion capable of detachably mounting the stirring blades at a desired angle with respect to the center axis of each of the support rods. Accordingly, the inclination of a predetermined angle of the stirring blade with respect to the center axis of the support rod on which the stirring blade is mounted can be changed. Accordingly, the inclination of an optimum predetermined angle with respect to the center axis of the support rod can be set corresponding to a kind (mainly, an amount of moisture that the waste contains) of the waste.

The main shaft stirring blade is formed in a triangular shape where one end of the main shaft stirring blade in a longitudinal direction of the main shaft is set relatively higher than the other end of the main shaft stirring blade in the longitudinal direction of the main shaft as viewed in a side view, and the main shaft stirring blade is formed on a surface of the main shaft in a state where the main shaft stirring blade is bent in the longitudinal direction as well as in the circumferential direction. With such configuration, a pressure applied to the waste that gets tangled with the surface of the main shaft is not constant and can be dispersed into a high pressure and a low pressure. Accordingly, the waste stacked on the surface of the main shaft can be peeled off in different directions and hence, it is possible to avoid the occurrence of a situation where the waste interrupts the rotation of the main shaft.

The detachably mounting portion is formed of: the fitting protruding portion having a regular polygonal shape that is formed on the proximal end portion (on a main shaft side) of the support rod; and the fitting recessed portion having the same regular polygonal shape as the fitting protruding portion that is formed on the distal end portion (on an inner peripheral side of the body) to which the stirring blade is connected, and the fitting protruding portion and the fitting recessed portion detachably engage with each other by fitting such that the fitting protruding portion is surrounded by the fitting recessed portion, and the faces of the regular polygonal shape where the fitting protruding portion and the fitting recessed portion are brought into contact with each other are selected so that an angle of inclination of the stirring blade with respect to a center axis of the support rod can be selected as desired. With such a configuration, in a case where the regular polygonal is octadecagon, the angle of inclination of the stirring blade with respect to the center axis of the support rod can be selected as desired at a minimum unit of the 20 degrees, and in a case where the regular polygonal shape is triacontahexagon, the angle of inclination of the stirring blade with respect to the center axis of the support rod can be selected as desired at a minimum unit of the 10 degrees. That is, a minimum unit of an angle of inclination of the stirring blade with respect to the center axis of the support rod for supporting the stirring blade can be suitably adjusted by the number of faces of the regular polygonal shape that is used in the fitting protruding portion and the fitting recessed portion.

Further, with the provision of the hot air supply unit capable of supplying hot air to the inside of the body, it is possible to apply heat and pressure to the waste accommodated in the body and hence, the waste is dried whereby the waste can be easily crushed. That is, hot air accelerates drying of the waste accommodated in the body so that the dried waste can be easily crushed by the stirring unit whereby crushing of the waste and the reduction of volume of the waste can be performed with high efficiency.

Further, the porous plate in which a plurality of through holes are formed is used as the stirring blade. The plurality of through holes are formed in a circular shape having a predetermined diameter (for example, 5 mm), and a moisture contained in the waste and finely crushed wastes pass through these through holes. Accordingly, it is possible to reduce a resistance between the waste in the body and the stirring blades that are brough into contact with the waste and hence, the waste in the body can be efficiently stirred.

The body includes: a charge opening through which a waste is charged into the body; and a discharge opening through which the waste whose volume is reduced in the body is discharged. The charge opening is disposed on an upper portion of the body, the discharge opening is disposed on a lower portion of the body, and a hot air supply opening through which hot air is supplied to the inside of the body is formed in the discharge opening. The charge opening having a cylindrical shape for the waste that is disposed on the upper portion of the body has a lower end and an upper end. The lower end of the charge opening is opened in the inside of the body, and a charge opening lid that is openable and closable is disposed so as to resist against an inner pressure (approximately 10 atmospheric pressure or more) in the casing body is mounted on the upper end of the charge opening whereby it is possible to prevent the waste to be crushed by stirring in the body from being blown off to the outside from the casing body under a predetermined pressure. In this manner, the charge opening for the waste is disposed at the upper portion of the body and hence, it is possible to easily charge the waste into the body.

The discharge opening having a cylindrical shape for the waste that is disposed on the lower portion of the body has an upper end and a lower end. The upper end of the discharge opening is opened in the body. A pressure lid is disposed on a lowermost portion of the lower end of the discharge opening so as to resist against an inner pressure (approximately 10 atmospheric pressure or more) in the casing body whereby it is possible to prevent the waste to be crushed by stirring in the body from being blown off to the outside from the body under a predetermined pressure. In this manner, the discharge opening for the waste is disposed on the lower portion of the body and hence, it is possible to easily discharge the waste whose volume is reduced by crushing in the body to the outside of the body.

The hot air supply opening capable of supplying hot air into the inside of the body is formed in the discharge opening that is disposed on the vertical lower portion of the body. By supplying hot air into the body through this hot air supply opening, it is possible to reduce clogging of a waste in the discharge opening. That is, even when the waste falls into the discharge opening disposed on the vertical lower portion of the body during a crushing treatment step, the waste is blown upward by the hot air supplied under a predetermined pressure. As a result, the waste is entirely diffused in the body along the inner peripheral surface of the body having a spherical shape and hence, efficiency of crushing of the waste generated by stirring of the waste using the first stirring blades can be enhanced.

With respect to the charge opening that is formed in a cylindrical shape where one end of the charge opening is connected to the inside of the body and the other end of the charge opening is openably and closably formed, a measurement device arranging portion may be formed on a side surface of the charge opening. A pressure measurement device that measures a pressure in the body or a temperature measurement device that measures a temperature in the body can be arranged on the measurement device arranging portion. With such a configuration, the temperature measurement device and the pressure measurement device can be arranged at the position away from the inside of the body in distance. Accordingly, the waste in a stirring state minimally clogs in a region where the measurement devices are arranged. Further, the measured devices are minimally affected by the stirring of the waste at the time of measurement and hence, the measurement accuracies of the measurement devices can be enhanced. Further, a maintenance operation of the measurement devices can be performed easily.

DESCRIPTION OF EMBODIMENTS

The present invention relates to a waste treatment apparatus that includes: a body having a spherical shape that is capable of accommodating a waste therein; and a stirring unit that is configured to stir the waste accommodated in the body, wherein the stirring unit includes: a main shaft that is horizontally and rotatably disposed at a center portion in the inside of the body; a plurality of main shaft stirring blades having a flat plate shape, the plurality of main shaft stirring blades being mounted on a surface of the main shaft; a plurality of support rods assembled to the main shaft at a predetermined interval, the plurality of support rods extending toward an inner peripheral surface of the body; and a plurality of stirring blades each having a rectangular flat plate shape, the plurality of stirring blades being mounted on distal ends of the plurality of support rods on an inner peripheral surface side of the body. The stirring unit further includes a detachably mounting portion that can detachably mount the stirring blade to the support rod at an arbitrary angle with respect to a center axis of each of the support rods.

Figure 1:
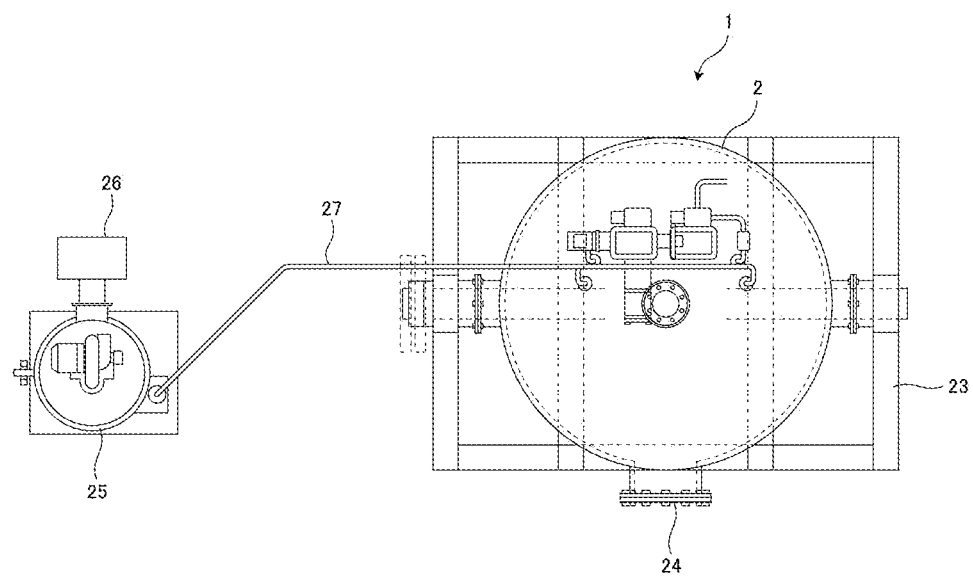
FIG. 1 is a schematic view illustrating the configuration of a waste treatment apparatus according to an embodiment of the present invention.
Figure 2:
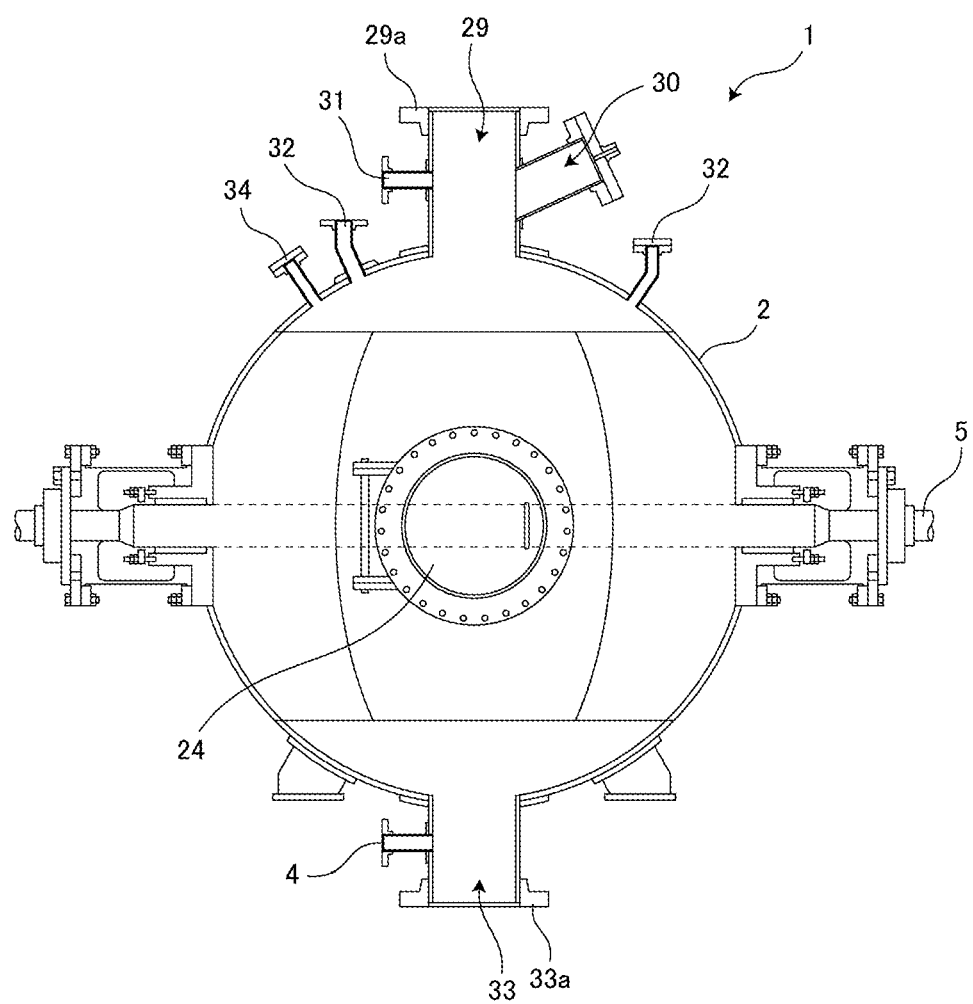
FIG. 2 is a front view illustrating an external appearance of the waste treatment apparatus according to the embodiment.
Figure 3:
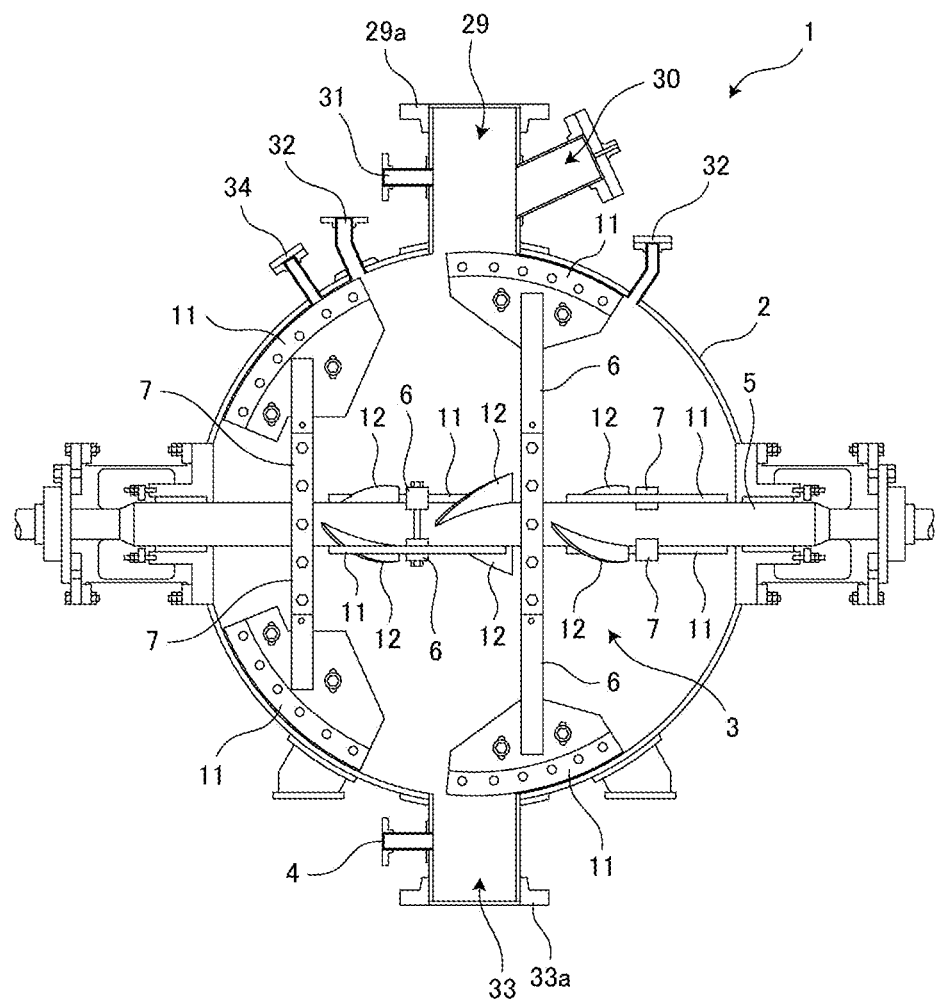
FIG. 3 is a cross-sectional view for describing the inner structure of a body of the waste treatment apparatus according to the embodiment.
Figure 4:
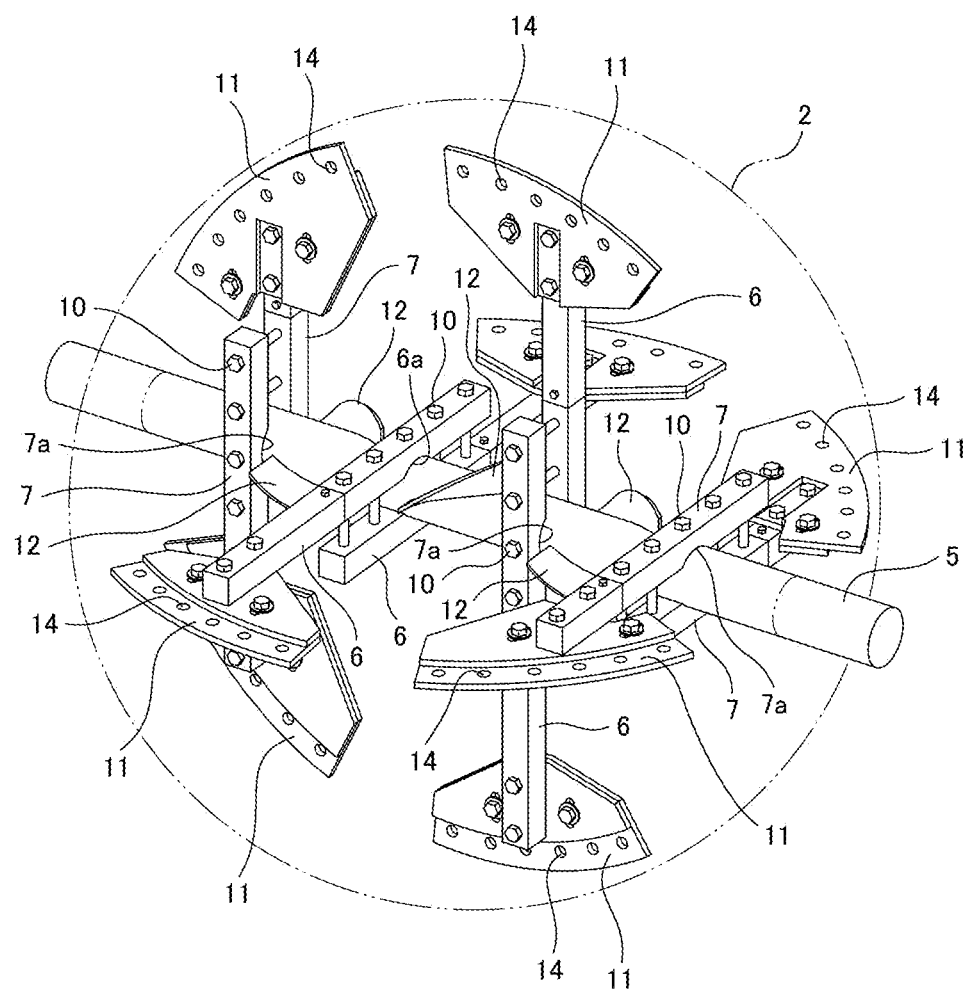
FIG. 4 is a perspective view for describing a mounting angle of a plurality of support rods assembled to a main shaft of the waste treatment apparatus according to the embodiment.
Figure 5A:
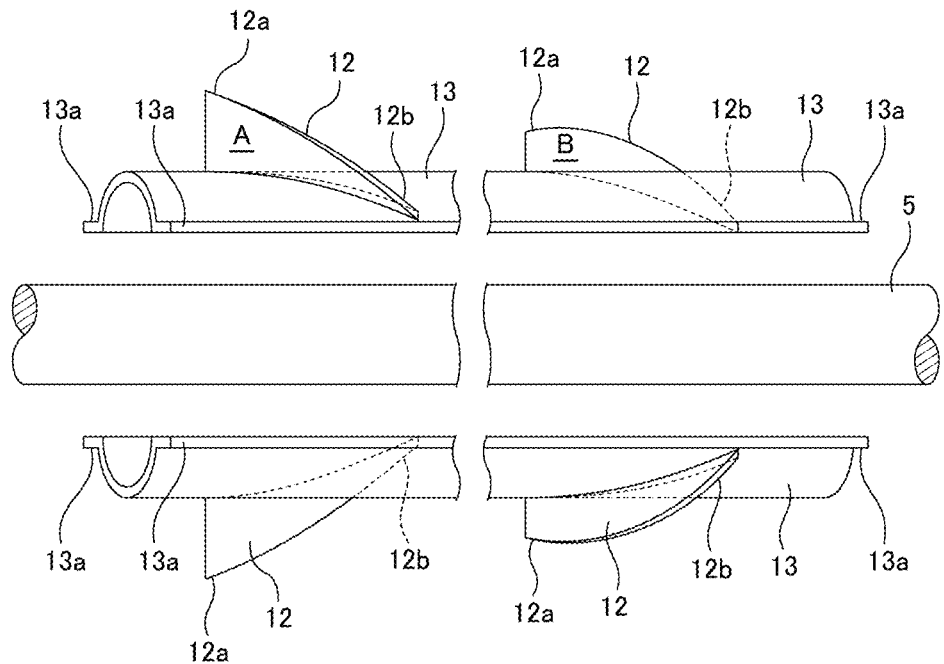
FIGS. 5A and 5B show views for describing the configuration of main shaft stirring blades mounted on a surface of the main shaft according to the embodiment.
Figure 5B:
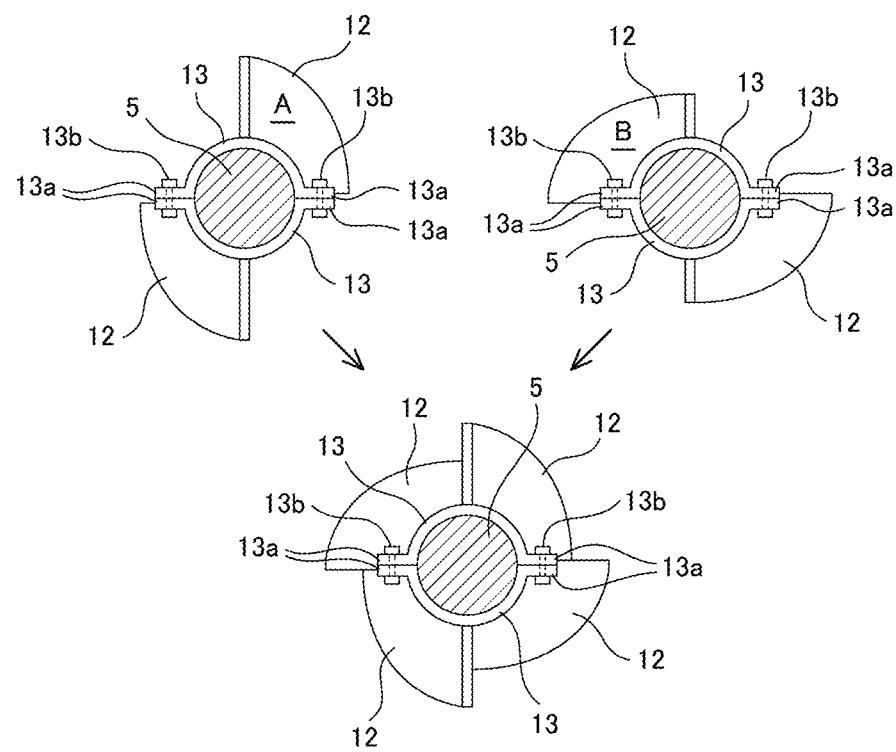
Figure 6:
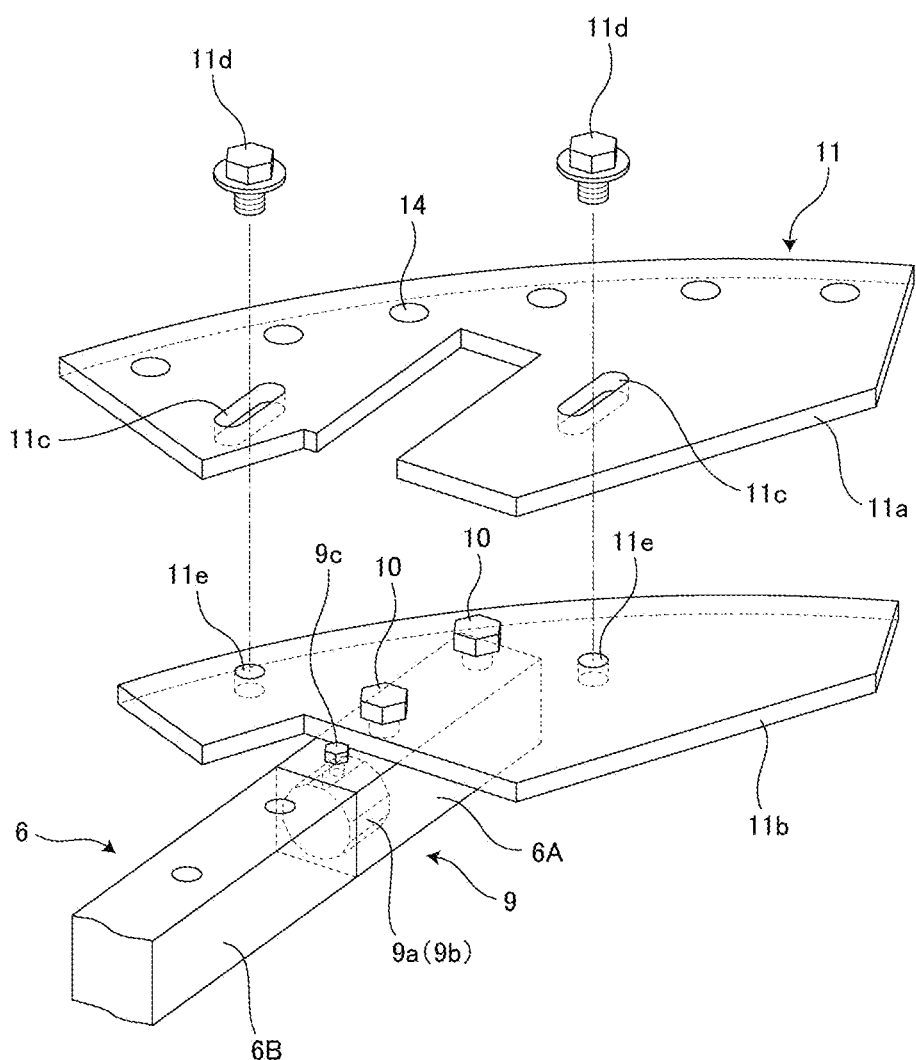
FIG. 6 is a view for describing the configuration of a stirring blade and a detachably mounting portion that are mounted on a support rod of the waste treatment apparatus according to the embodiment.
Figure 7:
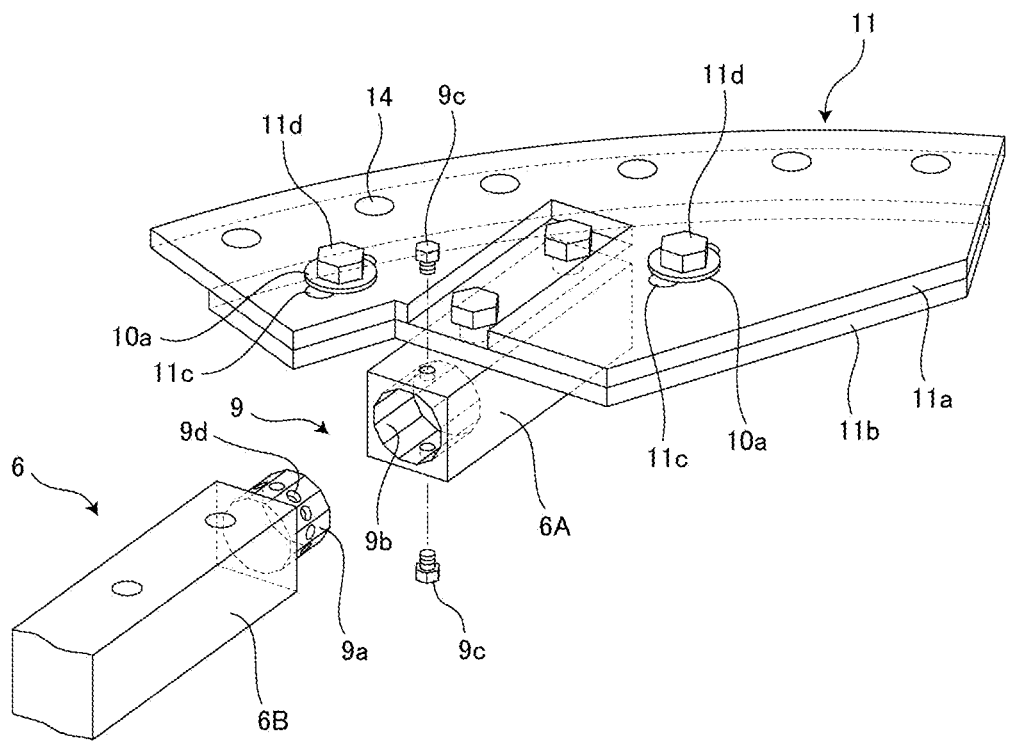
FIG. 7 is a view for describing the angle adjustment of an angle at the detachably mounting portion of the stirring blade that is mounted on the support rod of the waste treatment apparatus according to the embodiment.

Hereinafter, one example of an embodiment of the present invention is specifically described with reference to FIG. 1 to FIG. 7. FIG. 1 is a schematic view illustrating the configuration of a waste treatment apparatus according to the embodiment. FIG. 2 is a front view illustrating an external appearance of the waste treatment apparatus according to the embodiment. FIG. 3 is a cross-sectional view for describing the inner structure of a body of the waste treatment apparatus according to the embodiment. FIG. 4 is a perspective view for describing a mounting angle of a plurality of support rods assembled to a main shaft of the waste treatment apparatus according to the embodiment. FIGS. 5A and 5B show views for describing the configuration of a main shaft stirring blades mounted on a surface of a main shaft according to the embodiment. FIG. 6 is a view for describing the configuration of a stirring blade and a mounting and dismounting portion that are mounted on each support rod of the waste treatment apparatus according to the embodiment. FIG. 7 is a view for describing the angle adjustment at the mounting and dismounting portion of the stirring blade mounted on the support rod of the waste treatment apparatus according to the embodiment.

As illustrated in FIG. 1, the waste treatment apparatus 1 according to the embodiment is formed of: a body 2 that crushes a waste and reduces a volume of the waste; a heater 25 that heats air supplied to the body 2; and an air compressor 26 that applies a predetermined pressure to the air supplied to the body 2. The body 2 is fixedly mounted on an upper portion of a base 23 that is assembled in a rectangular shape using an H-shaped steel. The body 2 is connected to the heater 25 by way of a hot air supply pipe 27. The air compressor 26 is connected to the heater 25, and air having a predetermined pressure (10 atmospheric pressures) is supplied to the heater 25 from the air compressor, and air having the predetermined pressure and heated to a predetermined temperature (100° C.) by the heater 25 is supplied to the body 2 through the hot air supply pipe 27 so that the inside of the body 2 is pressurized. Further, an inner inspection window 24 that allows an operator to visually recognize a state of the inside of the body 2 is mounted on a side surface of the body 2.

As illustrated in FIG. 2 and FIG. 3, a charge opening 29 for a waste that is formed in a cylindrical shape is formed on an upper portion of the body 2, and a charge opening lid 29a that is openable and closable is mounted on an upper portion of the charge opening 29. Further, the charge opening 29 has a predetermined height (for example, 500 mm or more) from an outer peripheral surface of the body 2. Further, a pressure discharge pipe 31 for reducing a pressure in the body 2 is disposed below the charge opening lid 29a of the charge opening 29.

A branch pipe is mounted on a side of a charge portion opposite to the pressure discharge pipe 31, and the branch pipe forms a measurement device mounting portion 30. Various measurement devices such as a temperature sensor that measures a temperature in the body 2 and a pressure sensor that measures a pressure in the body 2 are mounted on the measurement device mounting portion 30. A safety valve 34 is mounted on an upper side portion of the body 2. The safety valve 34 can reduce a pressure in the body 2 for preventing breaking of the body 2 caused by a rapid elevation of a pressure in the body 2.

On a lower portion of the body 2, a discharge opening 33 having a cylindrical shape is formed. The discharge opening 33 is provided for taking out a waste whose volume is reduced in the body 2 to the outside of the body 2. A discharge opening lid 33a that is openable and closable is mounted on a lower end of the discharge opening 33. A valve not illustrated in the drawings is mounted on a lower portion of the discharge opening 33 thus providing the structure that prevents a reverse flow of the waste after the reduction of the volume of the waste. On a side portion of the discharge opening 33, a main hot air supply opening 4 that forms a hot air supply opening in the embodiment is formed. The main hot air supply opening 4 is connected to the heater 25 through the hot air supply pipe 27 described above. The main hot air supply opening 4 is a main air supply opening for supplying hot air having a predetermined temperature (for example, 100° C.) and a predetermined pressure (for example, 10 atmospheric pressures) to the inside of the body 2.

Two sub hot air supply openings 32 are formed on the upper portion of the body 2. The sub hot air supply openings 32 are also connected to the heater 25 through the hot air supply pipe 27. The sub hot air supply openings 32 are sub supply openings for supplying hot air having a predetermined temperature (for example, 100° C.) and a predetermined pressure (for example, 10 atmospheric pressures) to the inside of the body 2. In this manner, by forming the plurality of hot air supply openings (the main hot air supply opening 4, the sub hot air supply openings 32) on the upper and lower portions of the body 2, the hot air efficiently accelerates drying of the waste accommodated in the body 2 so that the dried waste can be easily crushed by a stirring unit 3 described later whereby crushing of the waste and reduction of the volume of the waste can be performed with high efficiency.

As illustrated in FIG. 3, the body 2 according to the embodiment is formed in a spherical shape, and the body 2 has a space in which the waste can be accommodated. The stirring unit 3 is disposed in the space. The stirring unit 3 is provided for stirring the waste accommodated in the body 2. The body 2 is formed using metal such as stainless steel. The body 2 has a pressure proof performance against a predetermined pressure (for example, at least 10 atmospheric pressures, for example, 12 or 13 atmospheric pressure).

The stirring unit 3 is a structural body for stirring the waste accommodated in the body 2. The stirring unit 3 is formed of: a main shaft 5; a plurality of (for example, 4) first support rods 6 and a plurality of (for example, 4) second support rods 7 that extend from the main shaft 5 toward the inner peripheral surface of the body 2 and are assembled to the main shaft 5; and stirring blades 11 having a flat plate shape that are mounted on distal ends of the first support rods 6 and the second support rods 7, that is, on an inner peripheral surface side of the body 2. Further, a plurality of main shaft stirring blades 12 mounted on an outer peripheral surface of the main shaft 5 also form the stirring unit 3.

The main shaft 5 is disposed in the body 2 having a spherical shape such that the main shaft 5 penetrates the center of the body 2 horizontally from both side surfaces. One end of the main shaft 5 is connected to an electrically operated motor not illustrated in the drawings, and the main shaft 5 is rotatably disposed at the center of the body 2. A speed reduction device also not illustrated in the drawings is mounted on a connecting portion between the electrically operated motor and the main shaft 5 disposed at one end of the main shaft 5. The speed reduction device restricts the rotation of the main shaft 5. The electrically operated motor and the main shaft 5 are connected to each other by way of the speed reduction device. The rotational direction of the shaft 5 is switchable between the forward direction and the reverse direction. Further, a rotational speed of the main shaft 5 is also adjustable by the speed reduction device.

In this embodiment, it is not always necessary that the body 2 has a spherical shape. The body 2 may be formed in an elliptical shape. That is, it is sufficient that the body 2 has a shape that allows easy stirring of the waste accommodated in the body 2 and allows the reduction of a size of the apparatus itself. Further, it is not always necessary that the material of the body 2 is stainless steel. It is sufficient that the material of the body 2 is a material that can ensure durability and pressure proof property of the body 2.

The first support rods 6 and the second support rods 7 that form the stirring unit 3 are rotated in the body 2 about the main shaft 5 by driving the electrically operated motor. With such rotation of the first support rods 6 and the second support rods 7, the stirring blades 11 mounted on the distal ends (on the inner peripheral surface side of the body 2) of the first support rods 6 and the second support rods 7 stir the waste accommodated in the body 2. In this manner, due to the rotation of the first support rods 6 and the second support rods 7 about the main shaft 5 that is brought about by the rotation of the main shaft 5, the waste is stirred in the body 2 by the stirring blades 11 that are mounted on the distal ends of the first support rods 6 and the second support rods 7 respectively, and the waste in the body 2 is crushed so that the reduction of the volume of the waste is accelerated.

The distal ends of the first support rods 6 and the second support rods 7, that is, the stirring blades 11 that are mounted on both ends of the first support rods 6 and the second support rods 7 on the inner peripheral surface side of the body 2 are disposed as close as possible to the inner peripheral surface of the body 2. That is, a gap of approximately 5 mm is formed between the distal ends of the first support rods 6 and the second support rods 7 and the inner peripheral surface of the body 2.

A distance of the gap between the stirring blades 11 and the inner peripheral surface of the body 2 is not limited to approximately 5 mm, and the distance differs corresponding to a kind of a waste to be stirred. That is, it is sufficient that the distance be a distance with which stirring efficiency of the waste is increased and, further, a gap that allows the waste to escape from the stirring blade 11 is minimally formed between the inner peripheral surface of the body 2 and each stirring blade. Further, it is desirable that the gap formed between the stirring blade 11 and the inner peripheral surface of the body 2 be finely adjustable.

The description is made with respect to the first support rods 6 and the second support rods 7 that are assembled to the main shaft 5, and the stirring blades 11 that are mounted on the distal ends (on the inner peripheral surface side of the body 2) of the first support rods 6 and the second support rods 7. As illustrated in FIG. 3 and FIG. 4, in this embodiment, two first support rods 6 and two second support rods 7 are assembled so as to sandwich the outer periphery of the main shaft 5. With respect to the first support rod 6 and the second support rod 7, one first support rod 6 and one second support rod 7 are respectively formed of two upper rods each made of steel (or aluminum) and having a prism shape and two lower rods each made of steel (or aluminum) and having a prism shape. On proximal ends of the first support rods 6 and proximal ends of the second support rods 7 that are brought into contact with the main shaft 5, curved portions 6a (or 7a) that correspond to the shape of the outer periphery of the main shaft 5 are formed. The proximal ends are connected to the main shaft 5 in a sandwiching manner by a plurality of connecting bolts 10 (five positions in the drawing). The distal ends of the first support rods 6 and the second support rods 7 extend from the main shaft 5 toward the inner peripheral surface of the body 2 respectively. A detachably mounting portion 9 is formed on the first support rods 6 and the second support rods 7 respectively. The stirring blades 11 are detachably mounted on the distal ends (on the inner peripheral surface side) of the first support rods 6 and on the distal ends (on the inner peripheral surface side) of the second support rods 7 by way of the detachably mounting portions 9. The detachably mounting portions 9 are described in detail later.

As illustrated in FIG. 4, the first support rod 6 and the second support rod 7 disposed adjacently to each other are fixedly mounted on the main shaft 5 in a state where the first support rod 6 and the second support rod 7 are displaced from each other on a plane perpendicular to the main shaft 5 by approximately 90 degrees in a circumferential direction. That is, the first support rods 6 and the second support rods 7 are respectively assembled to the main shaft 5 in a state where the first support rod 6 and the second support rod 7 are displaced from each other by approximately 90 degrees in a circumferential direction on the plane perpendicular to the main shaft 5 as viewed from the center of the main shaft 5. With such a configuration, when the main shaft 5 is rotated, it is possible to prevent the rotations of the stirring blades 11 that are respectively mounted on the distal ends of the first support rod 6 and the second support rod 7 about the main shaft 5 from being disposed on the same plane. Accordingly, it is possible disperse a contact between the stirring blades 11 respectively mounted on the distal ends of the first support rod 6 and the second support rod 7 and the waste accommodated in the body 2.

As illustrated in FIG. 3, the first support rod 6 and the second support rod 7 are assembled to the main shaft 5 respectively at angles with an equal distance in a left and right direction on the same plane. That is, as illustrated in FIG. 3, when the body 2 is viewed in a side view, the first support rod 6 and the second support rod 7 are assembled to the main shaft 5 respectively in a state where the first support rod 6 and the second support rod 7 are spaced apart from each other at the uniform distance in the horizontal direction from the center of the main shaft 5. More specifically, two first support rods 6 are assembled to the main shaft 5 respectively in a spaced-apart manner with a distance of an equal interval near the center of the main shaft 5 in the horizontal direction. Two second support rods 7 are assembled to the main shaft 5 in a spaced-apart manner with a distance of an equal interval remote from both ends from the center of the main shaft 5 in the horizontal direction. With such a configuration, the distal ends of the first support rods 6 are relatively long compared to the distal ends of the second support rods 7, and are disposed in an extending manner along the inner peripheral surface of the body 2.

The stirring blade 11 is formed using a steel plate (or an aluminum plate) having a rectangular flat shape. As illustrated in FIG. 3, the distal end (on the inner peripheral surface side) of the stirring blade 11 is formed in a shape where the stirring blade 11 is bent in an approximately fan shape that corresponds to the shape of the inner peripheral surface of the body 2. In this embodiment, a total width that is formed of respective widths of the plurality of stirring blades 11 mounted on the distal ends of the first support rods 6 and the second support rods 7 disposed adjacently to each other are respectively set to a length that covers a substantially entire region of the inner peripheral surface of the body 2 in the circumferential direction. Both ends of the stirring blade 11 in the width direction are rotated along the inner peripheral surface of the body 2 in a partially overlapping manner thus stirring the waste accommodated in the body 2. The stirring blade 11 is a porous plate in which a plurality of circular through holes 14 having a predetermined diameter (for example, 5 mm) are formed. The plurality of through holes 14 are formed such that a moisture contained in the waste and the finely crushed wastes that are generated as the crushing of the waste progresses pass the through holes 14. With such a configuration, a resistance of the stirring blades 11 that are brought into contact with the waste accommodated in the body 2 can be reduced and hence, the waste in the body 2 can be efficiently stirred and crushed.

As illustrated in FIGS. 5A and 5B, two main shaft stirring blades 12 that form the stirring unit 3 are mounted on an outer peripheral surface of the main shaft 5 in a state where two main shaft stirring blades 12 are disposed in a vertically (or laterally) symmetrical manner. The main shaft stirring blade 12 is formed on the surface of the main shaft 5 in a flat plate shape having an approximately triangular shape as viewed in a side view. That is, one end 12a of the main shaft stirring blade 12 in a short direction is set relatively higher than the other end 12b of the main shaft stirring blade 12 in the short direction. The main shaft stirring blade 12 is also formed in a shape where the main shaft stirring blade 12 extends in the longitudinal direction and is bent (approximately 90 degrees) in the circumferential direction on the surface of the main shaft 5. Two main shaft stirring blades 12 are disposed between assembling portions where the proximal end of the first support rod 6 and the proximal end of the second support rod 7 are assembled to the main shaft 5.

In this embodiment, as illustrated in FIG. 3, from the left side, two main shaft stirring blades 12 are mounted on the outer peripheral surface of the main shaft 5 between the second support rod 7 and the first support rod 6 on the left side. Another two main shaft stirring blades 12 are mounted on the outer peripheral surface of the main shaft 5 between the first support rod 6 and the first support rod 6 on an intermediate side. Still another two main shaft stirring blades 12 are mounted on the outer peripheral surface of the main shaft 5 between the first support rod 6 and the second support rod 7 on a right side. That is, in this embodiment, six main shaft stirring blades 12 in total are mounted on the outer peripheral surface on the main shaft 5.

Two main shaft stirring blades 12 are welded to outer peripheral surfaces of two upper and lower base plates 13 having a semi-circular cylindrical shape in a state where two main shaft stirring blades 12 extend in the longitudinal direction and is bent in the circumferential direction. Flanges 13a are formed on side edges in the longitudinal direction of two upper and lower semi-circular cylindrical base plates 13. Two upper and lower semi-circular cylindrical base plates 13 surround the outer peripheral surface of the main shaft 5. The flanges 13a of the semi-circular cylindrical base plates 13 are made to overlap with each other, and are fastened together by bolts 13b. With such a configuration, two main shaft stirring blades 12 are mounted on the surface of the main shaft 5 in the longitudinal direction in a vertical (or lateral) symmetry by 180 degrees.

As illustrated in FIGS. 5A and 5B, with respect to the plurality of main shaft stirring blades 12 disposed adjacently to each other, two kinds of main shaft stirring blades 12 are prepared. That is, the main shaft stirring blade 12 having a large height at an end 12a in the short direction (A in the drawing), and the main shaft stirring blade 12 having a low height at an end 12a in the short direction (B in the drawing) are prepared. TWO kinds of main shaft stirring blades 12 disposed adjacently to each other are mounted on the outer periphery of the main shaft 5 by making their phases different from each other by approximately 90 degrees in the circumferential direction. With such a configuration, as illustrated in FIG. 5B, as viewed in a side view using the main shaft 5 as the center, the plurality of main shaft stirring blades 12 having different phases by approximately 90 degrees vertically and laterally are raised toward the outer peripheral surface of the main shaft 5. In this manner, by mounting the plurality of (six in the drawing) main support stirring blades 12 on the surface of the rotating main shaft 5, a waste that gets tangled with the main shaft 5 can be efficiently pealed off from the main shaft 5 and hence, a stirring efficiency can be enhanced.

Hereinafter, the configuration of the stirring blade 11 mounted on the distal end of the first support rod 6 and on the distal end of the second support rod 7, and the configuration of the detachably mounting portion 9 of the stirring blade 11 are described with reference to FIG. 6 and FIG. 7. In the description made hereinafter, the configuration of the stirring blade 11 and the detachably mounting portion 9 mounted on the first support rod 6, and the configuration of the stirring blade 11 and the detachably mounting portion 9 mounted on the second support rod 7 are equal. Accordingly, the configuration of the stirring blade 11 and the detachably mounting portion 9 mounted on the distal end (inner peripheral surface side) of the first support rod 6 is described, and the description of the stirring blade 11 and the detachably mounting portion 9 mounted on the distal end (inner peripheral surface side) of the second support rod 7 is omitted.

As illustrated in FIG. 6, the stirring blade 11 is formed of a blade portion 11a and a base bottom portion 11b. The base bottom portion 11b is fixedly mounted on a distal end portion 6A of the first support rod 6 by a connecting bolt 10. By making a threaded portion 11d pass through an elongated hole 11c formed in the blade portion 1ss 1a and by making the threaded portion 11d threadedly engage with a threaded hole 11e formed in the base bottom portion 11b, the blade portion 11a is fastened to the base bottom portion 11b. The elongated hole 11c that is formed in the blade portion 11a is formed so as to enable the fine adjustment of a gap between the stirring blade 11 (the blade portion 11a) and the inner peripheral surface of the body 2 corresponding to a kind of a waste accommodated in the body 2. Such fine adjustment of the gap can be performed by selecting the position at which the threaded portion 11d passes through the elongated hole 11c.

In this manner, the stirring blade 11 is formed of the blade portion 11a and the base bottom portion 11b. Accordingly, for example, in a case where a mounting angle of the stirring blade 11 is to be changed with respect to a center axis of the first support rod 6 at the detachably mounting portion 9 of the first support rod 6 in the body 2 that is already installed, a distance between the base bottom portion 11b of the distal end portion 6A of the first support rod 6 and the inner peripheral surface of the body 2 can be widened by removing only the blade portion 11a from the base bottom portion 11b. Accordingly, as illustrated in FIG. 7, the distal end portion 6A and a proximal end portion 6B of the first support rod 6 are configured to be separable from each other.

As illustrated in FIG. 7, the first support rod 6 is configured such that the distal end portion 6A and the proximal end portion 6B are separable from each other, and the detachably mounting portion 9 is formed at a separating portion. The detachably mounting portion 9 is formed of: a fitting protruding portion 9a having a regular polygonal shape that is formed on the proximal end portion 6B of the first support rod 6; and a fitting recessed portion 9b having the same regular polygonal shape as the fitting protruding portion 9a that is formed on the distal end portion 6A to which the stirring blade 11 is connected. The fitting protruding portion 9a and the fitting recessed portion 9b engage with each other by fitting such that the fitting protruding portion 9a of the proximal end portion 6B is surrounded by the fitting recessed portion 9b of the distal end portion 6A, and the fitting protruding portion 9a of the proximal end portion 6B is fixedly mounted on two portions, that is, upper and lower portions of the fitting recessed portion 9b of the distal end portion 6A by fixing screws 9c. Accordingly, at the detachably mounting portion 9 of the first support rod 6, the distal end portion 6A to which the stirring blade 11 is connected is fixedly mounted on the fitting protruding portion 9a of the proximal end portion 6B of the first support rod 6. On the other hand, by removing the fixing screws 9c at two upper and lower portions of the fitting recessed portion 9b of the distal end portion 6A, the distal end portion 6A to which the stirring blade 11 is connected can be removed from the proximal end portion 6B. As illustrated in FIG. 7, screw holes 9d with which the fixing screws 9c engage are formed in respective faces of a polygonal shape (a dodecagon in the drawing) that forms the fitting protruding portion 9a of the proximal end portion 6B of the first support rod 6.

Due to the configuration of the detachably mounting portion 9 described above, with the use of the regular polygonal shape (dodecagon in the drawing) illustrated in FIG. 7, by selecting the faces of the regular polygonal shape where the fitting protruding portion 9a of the proximal end portion 6B of the first support rod 6 and the fitting recessed portion 9b of the distal end portion 6A to which the stirring blade 11 is connected are brought into contact with each other, an angle of inclination of the stirring blade 11 with respect to a center axis of the first support rod 6 can be selected as desired at a minimum unit of 30 degrees. By setting the regular polygonal shape that forms the fitting protruding portion 9a of the proximal end portion 6B and the fitting recessed portion 9b of the distal end portion 6A to an octadecagon, for example, the angle of inclination of the stirring blade 11 with respect to the center axis of the first support rod 6 can be selected as desired at a minimum unit of the 20 degrees. Further, by setting the regular polygonal shape that forms the fitting protruding portion 9a of the proximal end portion 6B and the fitting recessed portion 9b of the distal end portion 6A to a triacontahexagon, for example, the angle of inclination of the stirring blade 11 with respect to the center axis of the first support rod 6 can be selected as desired at a minimum unit of 10 degrees. That is, the number of faces of the regular polygonal shape that forms the fitting protruding portion 9a of the proximal end portion 6B and the fitting recessed portion 9b of the distal end portion 6A can be suitably changed corresponding to a minimum unit of an angle of inclination of the stirring blade 11 with respect to the center axis of the first support rod 6.

Further, also with respect to the second support rod 7, by using the detachably mounting portion 9 having the same configuration as the detachably mounting portion 9 of the first support rod 6 described above, an angle of inclination of the stirring blade 11 with respect to the center axis of the second support rod 7 can be adjusted as desired. In this manner, by imparting the inclination to the stirring blades 11 that are mounted on the distal ends (on inner peripheral sides) of the first support rod 6 and the second support rod 7, in the body 2, it is possible to generate convection in the direction opposite to the flow of waste that is stirred in the body 2 by the stirring blades 11. Accordingly, it is possible to make the stirred wastes impinge on each other due to the convection. As a result, not only the stirring efficiency is enhanced, but also the generation of friction between the wastes is increased and hence, it is possible to crush the wastes more efficiently.

Hereinafter, the manner of operation of the waste treatment apparatus 1 according to the embodiment is described.

First, a waste is charged into the body 2 through the charge opening 29 and, thereafter, the charge opening lid 29a of the charge opening 29 is closed. In this embodiment, the waste is, for example, as organic wastes, wastes that are produced at manufacturing factories of foods such as vegetable waste, distiller dregs, fermented dregs, bony parts of fishes and animals or the like, wastes that are produced in livestock industry such as feces and urines of livestock, sewage sludge and the like are named. Industrial wastes that include parts made of plastic or metal and can be used in a recycled manner are also named as the waste.

Next, the operation of the heater 25 and the air compressor 26 is started. Accordingly, air pressurized by the air compressor 26 is supplied to the heater 25 and the air is heated by the heater 25. The hot air that is heated by the heater 25 and is pressurized by the air compressor 26 is supplied to the inside of the body 2 from the main hot air supply opening 4 and the sub hot air supply openings 32.

Then, the main shaft 5 is rotated by the electrically operated motor (not illustrated in the drawings). Due to the rotation of the main shaft 5, the first support rods 6 and the second support rods 7 are rotated about the main shaft 5. The stirring blades 11 that are mounted on the distal ends (on the peripheral surface side of the body 2) of the first support rods 6 and the second support rods 7 are rotated in the body 2 along with the rotation of the first support rods 6 and the second support rods 7. Due to such an operation, the waste is stirred. A rotational speed of the main shaft 5 that forms the stirring unit 3 according to the embodiment is approximately 3 to 8 times per a minute. A rotational speed of the main shaft 5 can be changed by way of a speed reduction device (not illustrated in the drawing).

Further, due to such stirring, static electricity is also generated by a friction between the inner peripheral surface of the body 2 and the waste and by a friction between the stirring blades and the waste. By generating static electricity in the body 2 in this manner, the crushing of the waste and the reduction of the volume of the waste are accelerated. Further, the waste is decomposed by a pressure. The crushing of the waste and the reduction of the volume of the waste are further accelerated also by such an action.

During the stirring, hot air is supplied to the body 2 from a portion of the main hot air supply opening 4 disposed in the vicinity of the discharge opening 33 of the body 2. That is, the hot air is supplied to the body 2 such that the hot air blows up the waste from a bottom surface side of the body 2. Accordingly, it is possible to minimize a possibility that the waste is stacked on the bottom surface side of the body 2 and the portion of the discharge opening 33 thus clogging such portions. Hot air is also supplied to the body 2 through the sub hot air supply openings 32 formed on an upper portion of the body 2 for accelerating drying of the waste.

Further, a temperature and a pressure in the body 2 are measured during an operation of the waste treatment apparatus 1 so that the environmental information of the inside of the body 2 is monitored. In this case, the branch pipe is disposed on a side of a charge portion opposite to a side where the pressure discharge pipe 31 is disposed and the measurement device mounting portion 30 is formed on the branch pipe and hence, the measurement of the temperature and the pressure is minimally influenced by the stirring.

By performing the stirring treatment for a fixed time in accordance with the flow describe above, the waste in the body 2 is crushed and the volume of the waste is reduced while being dried. Accordingly, the volume of the waste at a point of time that the waste is charged into the body 2 is largely reduced, and is recovered from the discharge opening 33. By performing the steps described above, the treatment by the waste treatment apparatus 1 according the present invention is completed.

As has been described heretofore, the waste treatment apparatus 1 according the present invention can efficiently peel off the waste that gets tangled with the main shaft 5 by the main shaft stirring blades 12 mounted on the main shaft 5. Further, the inclination of the plurality of stirring blades 11 mounted on the distal ends of the first support rods 6 and the second support rods 7 with respect to the center axis of the main shaft 5 can be changed corresponding to a kind of the waste. Accordingly, the waste treatment apparatus 1 according the present invention is excellent in safety, and can perform the volume reduction treatment of the waste with high efficiency.

Although the present invention has been described with reference to the embodiment described above, the present invention is not limited to such embodiment. Further, the respective advantageous effects described above are merely the enumeration of most preferred advantageous effects acquired by the present invention, and the advantageous effects of the present invention are not limited to the advantageous effects acquired by the embodiment.

REFERENCE SIGNS LIST

1: waste treatment apparatus
2: body
3: stirring unit
4: hot air supply opening
5: main shaft
6: first support rod
7: second support rod
11: stirring blade
12: main shaft stirring blade
13: base plate
14: through hole
23: base
24: inner inspection window
25: heater
26: air compressor
27: hot air supply pipe
29: charge opening
30: measurement device mounting portion
31; pressure discharge pipe
32: sub hot air supply opening
33: discharge opening

The invention claimed is:

1. A waste treatment apparatus comprising: a body having a spherical shape and configured to accommodate a waste therein; and
a stirring unit configured to stir the waste accommodated in the body, wherein
the stirring unit includes:
a main shaft horizontally and rotatably disposed at a center portion in an inside of the body;
a plurality of main shaft stirring blades having a flat plate shape, the plurality of main shaft stirring blades being mounted on a surface of the main shaft;
a plurality of support rods assembled to the main shaft at a predetermined interval, the plurality of support rods extending toward an inner peripheral surface of the body; and
a plurality of stirring blades each having a rectangular flat plate shape, the plurality of stirring blades being mounted on distal ends of the plurality of support rods on an inner peripheral surface side of the body, wherein
the stirring unit further includes a detachably mounting portion that is configured to detachably mount the stirring blade on the support rod at a desired angle with respect to a center axis of the support rod,
the main shaft stirring blade is formed in a triangular shape where one end of the main shaft stirring blade in a longitudinal direction of the main shaft is set relatively higher than the other end of the main shaft stirring blade in the longitudinal direction of the main shaft as viewed in a side view, and
the main shaft stirring blade is formed on a surface of the main shaft in a state where the main shaft stirring blade is bent in the longitudinal direction as well as in a circumferential direction.

2. The waste treatment apparatus according to claim 1, wherein the detachably mounting portion is formed of: a fitting protruding portion having a regular polygonal shape that is formed on a proximal end portion of the support rod; and a fitting recessed portion having the same regular polygonal shape as the fitting protruding portion that is formed on a distal end portion to which the stirring blade is connected, and
the fitting protruding portion and the fitting recessed portion are configured to detachably engage with each other by fitting such that the fitting protruding portion is surrounded by the fitting recessed portion, and the faces of the regular polygonal shape where the fitting protruding portion and the fitting recessed portion are brought into contact with each other are selected so that an angle of inclination of the stirring blade with respect to a center axis of the support rod is selectable as desired.

3. The waste treatment apparatus according to claim 1, further comprising a hot air supply unit capable of supplying hot air to the inside of the body, wherein
the stirring blade is formed of a porous plate in which a plurality of through holes are formed.

4. A waste treatment apparatus comprising: a body having a spherical shape and configured to accommodate a waste therein; and
a stirring unit configured to stir the waste accommodated in the body, wherein
the stirring unit includes:
a main shaft horizontally and rotatably disposed at a center portion in an inside of the body;
a plurality of main shaft stirring blades having a flat plate shape, the plurality of main shaft stirring blades being mounted on a surface of the main shaft;
a plurality of support rods assembled to the main shaft at a predetermined interval, the plurality of support rods extending toward an inner peripheral surface of the body; and
a plurality of stirring blades each having a rectangular flat plate shape, the plurality of stirring blades being mounted on distal ends of the plurality of support rods on an inner peripheral surface side of the body, wherein
the stirring unit further includes a detachably mounting portion that is configured to detachably mount the stirring blade on the support rod at a desired angle with respect to a center axis of the support rod,
the detachably mounting portion is formed of: a fitting protruding portion having a regular polygonal shape that is formed on a proximal end portion of the support rod; and a fitting recessed portion having the same regular polygonal shape as the fitting protruding portion that is formed on a distal end portion to which the stirring blade is connected, and
the fitting protruding portion and the fitting recessed portion are configured to detachably engage with each other by fitting such that the fitting protruding portion is surrounded by the fitting recessed portion, and the faces of the regular polygonal shape where the fitting protruding portion and the fitting recessed portion are brought into contact with each other are selected so that an angle of inclination of the stirring blade with respect to a center axis of the support rod is selectable as desired.

5. The waste treatment apparatus according to claim 4, further comprising a hot air supply unit capable of supplying hot air to the inside of the body, wherein
the stirring blade is formed of a porous plate in which a plurality of through holes are formed.

* * * * *